United States Patent [19]

Bond et al.

[11] Patent Number: 4,759,594

[45] Date of Patent: Jul. 26, 1988

[54] HOLOGRAPHIC MATERIAL

[75] Inventors: Anthony J. Bond, Leigh; Glenn P. Wood, Hale; Fiona E. Davidson, Henbury, all of England

[73] Assignee: Ciba-Geigy AG, Basel, Switzerland

[21] Appl. No.: 35,023

[22] Filed: Apr. 6, 1987

[30] Foreign Application Priority Data

Apr. 4, 1986 [GB] United Kingdom ................. 8608279

[51] Int. Cl.[4] .......................... G03C 5/04; G03H 1/04

[52] U.S. Cl. ...................................... 350/3.61; 430/1; 430/2

[58] Field of Search ....................... 350/3.61, 3.6, 3.62, 350/3.63, 3.64; 430/1, 2

[56] References Cited

U.S. PATENT DOCUMENTS

| | | | |
|---|---|---|---|
| 3,617,274 | 11/1971 | Lin | 350/3.61 |
| 3,967,963 | 7/1976 | Graube | 350/3.61 |
| 4,056,395 | 11/1977 | Sato et al. | 350/3.61 |
| 4,084,970 | 4/1978 | Bloom et al. | 350/3.61 |
| 4,217,405 | 8/1980 | Benton | 430/2 |
| 4,254,193 | 3/1981 | Yokono et al. | 430/1 |
| 4,339,513 | 7/1982 | Alvarez et al. | 430/1 |
| 4,367,911 | 1/1983 | Graube | 350/3.61 |
| 4,422,713 | 12/1983 | Grant et al. | 350/3.61 |
| 4,431,259 | 2/1984 | Bjorklund et al. | 350/3.61 |
| 4,458,345 | 7/1984 | Bjorklund et al. | 350/3.61 |

FOREIGN PATENT DOCUMENTS 8605286 9/1986 PCT Int'l Appl. ................ 350/3.61

OTHER PUBLICATIONS

Hernandez et al., "Role of Double-Exposure Holography on Shrinkage Effect in Silver Halide Gelatin, "*Optica Acta,* vol. 32, No. 4, 1985, pp. 469-477.

Coleman et al., "Controlled Shifting of the Spectral Response of Reflection Holograms, " *Applied Optics,* vol. 20, No. 15, Aug. 1, 1981, pp. 2600-2601.

*Primary Examiner*—Bruce Y. Arnold
*Assistant Examiner*—Martin Lerner
*Attorney, Agent, or Firm*—Wenderoth, Lind & Ponack

[57] ABSTRACT

Holographic material comprising on a light transparent base at least two silver halide emulsion layers wherein the shrinking factor SF, the ratio of the replay wavelength or the ratio of the thicknesses of the layer before and after processing, of each of the layers differs at least by 0.02.

14 Claims, 3 Drawing Sheets

HOLOGRAPHIC MATERIAL

Figure 1:
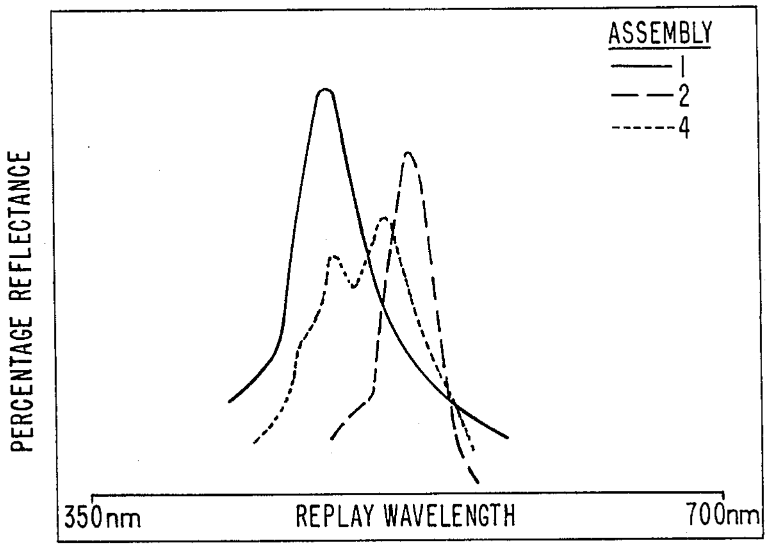

This invention relates to novel holographic material. Holograms can be made using very fine grain silver halide sensitised photographic material by subjecting the material to a holographic exposure using a laser to produce an object and a reference beam. A series of interference fringes are set up which may be fixed in the material by a photographic developing step. These fringes may be used to reconstruct a hologram using either coherent or incoherent light depending on the exposure conditions employed.

Amplitude holograms are obtained when the developed silver is left in the photographic material and is used to reconstruct the holographic image. However, brighter holograms may be obtained when the developed silver is removed from material or converted back to silver halide and redistributed. In these cases silver halide is used to reconstruct the holographic image. A hologram which has been produced by this method is called a phase hologram. When a phase hologram is produced by causing the object beam and the reference beam to expose the holographic material from the same side a transmission hologram is obtained wherein the interference fringes are predominantly inclined at a significant angle to the plane of the holographic material after processing. However when a phase hologram is produced by causing the object beam and the reference beam to expose the holographic material from different sides of the holographic material a reflection hologram is obtained wherein the interference fringes lie predominantly parallel to the plane of the holographic material.

Reflection holograms are of particular use for display purposes as they can be reconstructed using white light.

Reflection holograms of this type are obtained by silver halide development followed by a silver bleach process wherein the developed silver is removed from the material. When a so-called solvent bleach system is used the white light replay of the hologram will be shifted to a lower wavelength compared with the wavelength of the laser used to expose the holographic material. This shift is due to the gelatin shrinking because of the loss of silver from the layer in which the fringes lie.

Changes in the replay wavelength can be effected within certain limits to obtain any desired colour of the reconstructed hologram for white light display purposes.

This may be achieved for example by selecting the wavelength of the laser used for exposing the holographic material or by selection of the gelatin to silver ratio in the silver halide layer because (to a close approximation):

$$\text{Replay wavelength} = \text{SF} \times \text{exposing wavelength}$$

where SF is the shrinkage factor.

$$SF = \frac{\text{thickness of layer after processing}}{\text{thickness layer before processing}}$$

The gelatin/silver ratio of a silver halide layer effects the SF of the layers. Thus the less the gelatin coating weight compared with the silver coating weight the lower the replay wavelength.

The maximum shifts in the replay wavelength due to the gelatin/silver ratios in the coated silver layer are shown in Table I below.

TABLE I

| Gel/Ag Ratio (in coating weight) | SF | Replay λ after 694 nm exposure | Replay λ after 633 mm exposure |
|---|---|---|---|
| 2:1 | 0.85 | 590 | 540 |
| 1.5:1 | 0.81 | 560 | 512 |
| 1:1 | 0.74 | 513 | 470 |
| 0.83:1 | 0.71 | 490 | 450 |

However there are various other ways of altering the SF of a silver halide layer.

We have found that a holographic assembly which comprises silver halide layers exhibiting different shrinkage factors after exposure and processing yields a reflection hologram which has a desirably increased broad band replay wavelength.

Therefore according to the present invention there is provided holographic material which comprises a light transparent base having coated thereon at least two gelatin silver halide emulsion layers wherein the SF of the layers differs at least by 0.02.

Preferably the holographic material comprises two gelatino silver halide emulsion layers the SF of one layer being at least 0.02 greater than the other layer.

Preferably the silver halide used in all the layers is substantially pure silver bromide having an average grain size of about 0.04 μm.

In one embodiment of the present invention the gelatino silver halide emulsion layers each have differing gel/silver ratios such that the difference in SF between each layer is at least 0.02.

In another embodiment of the present invention the difference of at least 0.02 in SF between two gelatino silver halide emulsion layers is achieved by incorporating in one layer a water soluble compound which is dissolved out of the layer during processing.

Preferably in this embodiment there are two gelatino silver halide emulsion layers one coated on one side of the base and the other on the reverse side of the base. This is to prevent the water-soluble compound from migrating from the emulsion to which it was added to the other layer during coating which is likely to occur if both layers were coated on the same side of the base.

It is also possible to incorporate different amounts of water-soluble compounds in the two layers such that the SF of each layer differs by at least 0.02 but this is not preferred as it is a more complicated procedure.

Preferably the water soluble compound yields a colourless aqueous solution which dissolves in water and is soluble to the extent of at least 3 g/liter of water and more preferably to the extent of at least 20 g/liter of water.

Preferably the water soluble compound is an organic compound but inorganic compounds for example salts can be used but their use can cause trouble as they tend to crystalise out in the emulsion and thus alter the physical and optical characteristics of the emulsion.

Examples of water-soluble organic compounds which can be used in the holographic material of the present emulsion include the following classes of compounds:

(a) saturated and unsaturated mono- and dicarboxylic acid amides, particularly those of formula R—CO—$NH_2$ or R—$(CONH_2)_2$ wherein R represents a monovalent or divalent alkyl or alkylene radical having 1-6 carbon atoms, or the group —CH=CH—, $CH_2$=CH— of $CH_3$CH=CH—, also phenyl, phenylene, toyl or tolylene also heterocyclic monovalent or divalent saturated and/or unsaturated 5— or 6— membered ring, having at least one N, O, S, CO or NH in the ring, whereby the symbol R can optionally be substituted also by OH, $NH_2$ halogen or hydroxyalkyl having 1-3 carbon atoms. Useful acid amides are, for example, acetamide, chloroacetamide, nicotinic acid amide and benzamide;

(b) lactams such as d-valerolactam, α-caprolactam and oenantholactam;

(c) acid imides or derivatives of acid imides, especially those of the general formula;

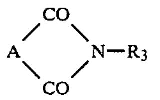

wherein A represents —CH=CH— or $(CH_2)_n$, wherein n is 1-6, and A can optionally be substituted by OH, $NH_2$ halogen, hydroxyalkyl ($C_1$-$C_3$) groups, and $R_3$ represents H, OH or hydroxyalkyl ($C_1$-$C_3$), examples of these are: succinimide, maleinimide and N-hydroxysuccinimide;

(d) oximes such as acetoneoxime, cyclohexanoneoxime and diacetylmonoxime;

(e) aliphatic or aromatic, at least bivalent alcohols, such as 2,2-dimehtyl- and 2,2-diethylpropanediol-1,3; dihydroxyacetone, o-xylylene glycol, erythrite, D-fructose, sucrose, lactose, maltose, xylite, sorbitol and mannitol; also hydroquinone although it will exhibit some developing activity, (f) polyalkylene glycols which are photographically inert, such as polyethylene glycol preferably having a molecular weight of 1,000 to 20,000, especially those of the formula

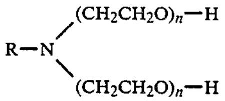

wherein R represents a saturated or unsaturated alkyl radical having 9 to 30 carbon atoms, and n and m each represents the numbers 3 to 200;

and also some wetting agents for example wetting agents based on ethylene or propylene oxides such as alkylphenoxypoly (hydroxy-propylene) can be used, (g) and carbamic acid esters, such as carbamic acid methyl ester, carbamic acid ethyl ester, and carbamic acid propyl ester.

The preferred class of compound for use in the present invention are the aliphatic at-least-bivalent alcohols of (e). Especially preferred compounds are sorbitol which has a water solubility of 830 g/liter at 20° C., sucrose which has a water solubility of 2500 g/liter at 20° C. and lactose which has a water solubility of 170 g/liter at 20° C.

Table II below shows the SF differences attainable by having one layer with no water-soluble compound and differing amounts of water-soluble compound in the other layer. The gel/silver ratios of all the layers is 1.5 gel:1 Ag.

TABLE II

| Additions | SF |
|---|---|
| None | .81 |
| 0.154 g sorbitol per gram silver | .78 |
| 0.308 g sorbitol per gram silver | .73 |

The use of silver soluble additives in gelatino silver halide emulsions to alter the replay wavelength of the layer after exposure and processing is described in our co-pending patent application Ser. No. 035,024 filed on even date herewith.

The light transparent base used in holographic material of the present invention may be any transparent base used for photographic film material for example subbed cellulose triacetate, acetate butyrate and oriented polycarbonate, polystyrene and polyethylene terephthalate. Alternatively a glass plate can be used.

The gelatino silver halide emulsions are preferably dye sensitised to be optimally sensitive to the wavelength of the light emitted by the laser which is to be used to expose the holographic material.

Very often the holographic material is sensitised to a laser which emits red light. In this case any of the known red sensitising dyes can be used to sensitise the silver halide grains to red light. Preferably if a He:Ne laser is to be used for the exposure a dye is chosen which exerts its maximum sensitising effect at between 620 and 650 nm and if a pulsed ruby laser is to be used a sensitising dye which exerts its maximum sensitising effect at between 680 and 710 nm is chosen.

When the holographic material of the pesent invention comprises gelatino silver emulsion layers with differing gel/Ag ratios the material after exposure is processed with a silver halide developing agent followed by a so-called solvent bleach which removes the developed silver from the layer.

When the holographic material of the present invention comprises one gelatino silver halide emulsion layer which comprises a water-soluble compound preferably the developed silver after silver halide development is bleached using a rehalogenating bleach system as more easily controllable results can be obtained than by use of a solvent bleach system with such an assembly.

The following examples will serve to illustrate the invention.

EXAMPLE 1

Three gelatino silver halide emulsions were prepared from a substantially pure silver bromide having an average crystal size of 0.04 microns.

Emulsion A had a gel/Ag ratio of 1.5/1 and a shrinkage factor of 0.81

Emulsion B had a gel/Ag ratio of 0.85/1 and a shrinkage factor of 0.71

Emulsion C had a gel/Ag ratio of 2/1 and a shrinkage factor of 0.85

Each of these emulsions were sensitised with red sensitising dye so that they were optionally sensitive to 633 nm the emission wavelength of a He:Ne laser. (In fact the dye used rendered the emulsion sensitive also to a pulsed ruby laser).

The following holographic assemblies were prepared by coating emulsions A, B and C on to transparent polyester film base.

Assembly 1 comprised a single layer of emulsion A so that the coating weight of the layer was 3.0 $g/m^2$ Ag and 4.50 $g/m^2$ gelatin.

Assembly 2 comprised a single layer of emulsion B so that the coating weight of the layer was 3.0 $g/m^2$ Ag and 2.55 $g/m^2$ gelatin.

Assembly 3 comprised a single layer of emulsion C so that the coating weight of the layer was 3.0 $g/m^2$ Ag and 6.0 $g/m^2$ gelatin.

Assembly 4 comprised a thin layer of emulsion A having a coating weight of 1.5 $g/m^2$ Ag and 2.25 $g/m^2$ gelatin coated on the base. On this layer was coated a thin layer of emulsion B having coating weight of 1.5 $g/m^2$ Ag and 1.25 $g/m^2$ gelatin. Thus the SF difference between the two layers is 0.1.

Assembly 5 comprised a thin layer of emulsion A having a coating weight of 1.5 $g/m^2$ Ag and 2.25 $g/m^2$ gelatin coated on the base. On this layer was coated a thin layer of emulsion C having a coating weight of 1.5 $g/m^2$ Ag and 3.0 $g/m^2$ gelatin. Thus the SF difference between the two layers is 0.04.

Assembly 6 comprised a thin layer of emulsion B having a coating weight of 1.5 $g/m^2$ Ag and 1.25 $g/m^2$ gelatin coated on the base. On this layer was coated a thin layer of emulsion C having a coating weight of 1.5 $g/m^2$ Ag and 3.0 $g/cm^2$ gelatin. Thus the SF different between the two layers is 0.14.

Assembly 7 comprised a thin layer of emulsion B having a coating weight 1.5 $g/m^2$ Ag and 1.25 $g/m^2$ gelatin coated on the base. On this layer was coated a thin layer of emulsion A having coating weight of 1.5 $g/m^2$ Ag and 2.26 $g/m^2$ gelatin. On this layer was coated a thin layer of emulsion C having a coating weight of 1.5 $g/m^2$ Ag and 3.0 $g/m^2$ gelatin. Thus the SF difference between the first and second layer is 0.1 and the SF difference between the second and the third layer is 0.04.

All seven assemblies were holographically exposed using a 5 mW He:Ne laser by a Denisyuk exposure method using a brushed aluminum plate to yield (after processing) a reflection hologram.

The processing was carried out as follows:

All the assemblies were developed for 2 minutes in a solution of the following formulation:

| | | |
|---|---|---|
| Sodium Sulphite Anhydrous | 30 | g |
| Hydroquinone | 10 | g |
| Sodium Carbonate | 60 | g |
| Water to | 1000 | ml |

The assemblies were then transferred to a solvent bleach bath of the following composition:

| | | |
|---|---|---|
| Potassium dichromate | 4 | g |
| Sulphuric acid (conc) | 4 | g |
| Water to | 1000 | ml |

until all the silver had bleached which was about 2 minutes in running water. The holgram in each assembly was then reconstructed using white light and the replay wavelength noted.

The results are set out graphically in the accompanying FIGS. 1 to 4.

FIG. 1 shows the reply wavelength of assembly 1, of assembly 2 and of assembly 4.

Figure 2:
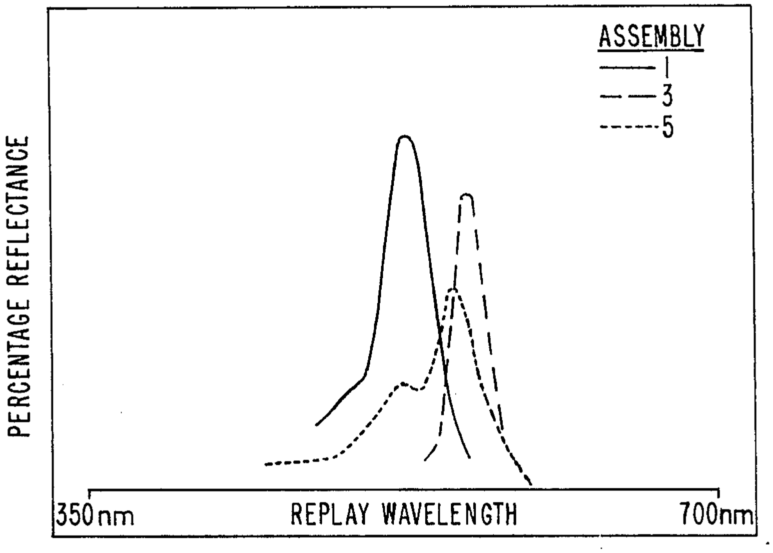

FIG. 2 shows the replay wavelength of assembly 1, of assembly 3 and of assembly 5.

Figure 3:
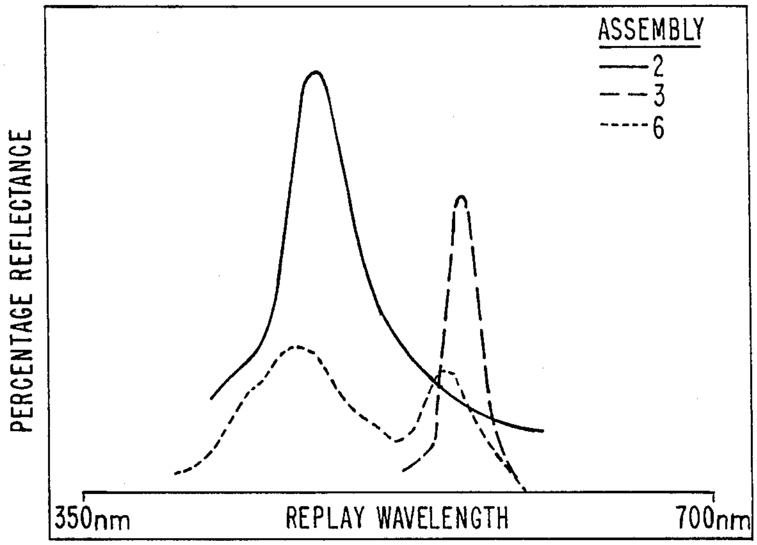

FIG. 3 shows the replay wavelength of assembly 2, of assembly 3 and of assembly 6.

Figure 4:
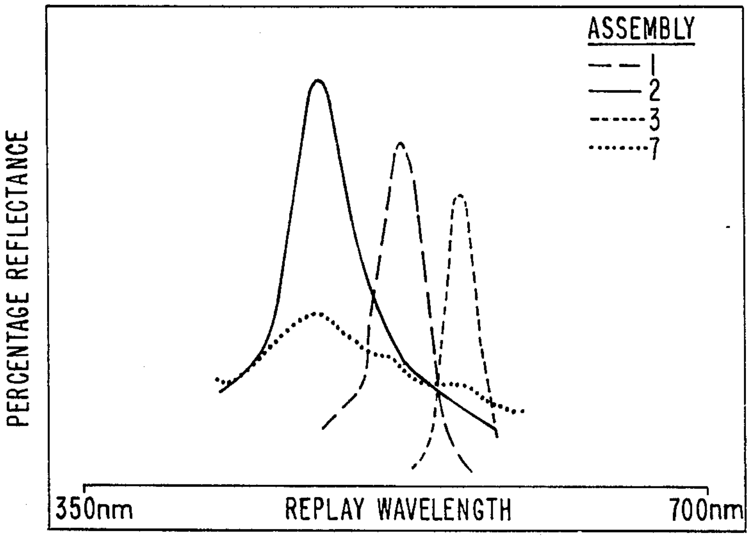

FIG. 4 shows the replay wavelength of assemblies 1,2,3 and 7.

From these figures the broad replay wavelength of the assemblies according to the present invention, viz assemblies 4, 5 and 6, can be seen.

In FIG. 3 the extremely broad replay wavelength of assembly 6 is apparent. In FIG. 4 the extremely broad replay of assembly 7 is apparent as is the reduction in reflectance.

Another sample of assembly 6 was prepared but this time it was exposed to an object which comprised a group of figures, using a pulsed ruby laser. The assembly was processed as just set forth. When the hologram was reconstructed using white light a metallic blue hologram of the group of figures were observed which was very distinctive and bright.

EXAMPLE 2

Two assemblies were prepared one comprised on one side of a sheet of transparent polyester film a layer of emulsion A as used in Example 1 at a coating weight of 1.5 $g/m^2$ Ag and 2.25 $g/m^2$ gelatin. Another layer of emulsion A at a similar coating weight was coated on the reverse side of the base sheet. This is assembly 8.

On the surface of another sheet of transparent polyester base there was coated a layer of emulsion A as used in Example 1 at a coating weight of 1.5 $g/m^2$ Ag and 2.25 g/m2 gelatin. On the reverse side of this sheet of base there was coated a similar emulsion at the same coating weight but this emulsion comprised 0.308 g/sorbitol per gram of silver in the emulsion. This is assembly 9.

Both assemblies were holographically exposed using a pulsed ruby laser by a Denisyuk exposure method using a brushed aluminium plate as an object to yield (after processing) a reflection hologram.

Both samples were processed as follows:

Both the assemblies were developed for 2 minutes in a solution of the following formulation:

| | | |
|---|---|---|
| Sodium Sulphite Anhydrous | 30 | g |
| Hydroquinone | 10 | g |
| Sodium Carbonate | 60 | g |
| Water to | 1000 | ml |

The two assemblies were then transferred to a rehalogenating bleach bath of the following composition:

| | | |
|---|---|---|
| $Fe(NH_4)EDTA$(1.8 m Solution) | 150 | mls |
| KBr | 20 | g |
| Water to | 1000 | mls |

until all silver metal had been bleached out which was about 2 minutes.

The samples were then water washed for 2 minutes in running water.

Figure 5:
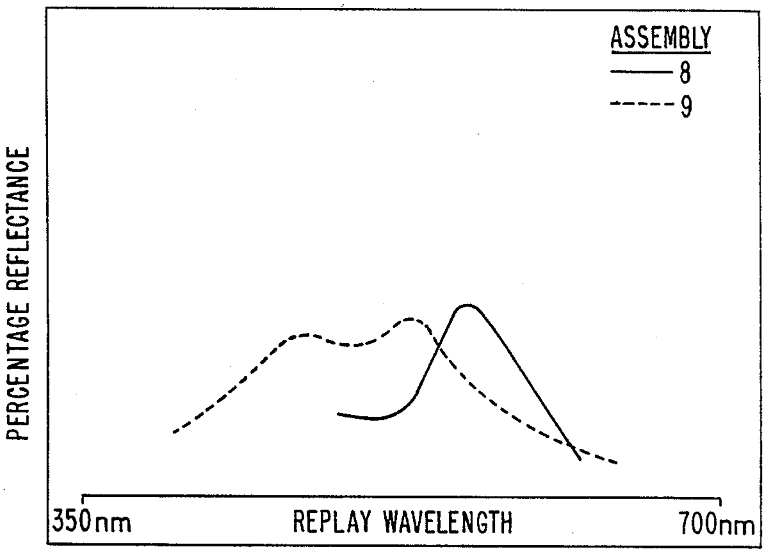

The hologram in each assembly was then reconstructed using white light and the replay wavelength of the hologram was plotted as shown in the accompanying FIG. 5.

This shows the broad band replay of the assembly 9 which s an assembly according to the present invention.

Similar results were obtained when similar amounts of sucrose and lactose were added instead of the sorbitol.

We claim:

1. Holographic material which comprises a light transparent base having coated thereon at least two gelatino silver halide emulsion layers wherein the shrinkage factor, SF, the ratio of the replay wavelength to the exposing 3 wavelength or the ratio of the thicknesses of the layer before and after processing, of each of the layers differs at least by 0.02.

2. Holographic material according to claim 1 which comprises two gelatins silver halide emulsion layers the shrinkage factor, SF, of one layer being at least 0.02 greater than the outer layer.

3. Holographic material according to claim 1 wherein the silver halide used in all the layers is substantially pure silver bromide having an average grain size of about 0.04 μm.

4. Holographic material according to claim 1 wherein the gelatino silver halide emulsion layers each have differing gel/silver ratios such that the difference in shrinkage factors, SF, between each layer is at least 0.02.

5. Holographic material according to claim 1 wherein the difference of at least 0.02 in shrinkage factor, SF, between two gelatino silver halide emulsion layers is achieved by incorporating in one silver halide layer a water soluble compound which is dissolved out of the layer during processing.

6. Holographic material according to claim 5 which comprises two gelatino silver halide emulsion layers, one coated on one side of the base and the other on the reverse side of the base.

7. Holographic film material according to claim 5 wherein the water-soluble compound employed is selected from a saturated or unsaturated mono- or dicarboxylic acid amide, a lactam, an acid imide or a derivative of an acid imide, an oxime, an aliphatic or aromatic at least bivalent alcohol, a polyalkylene glycol or a carbamic acid ester.

8. Holographic film material according to claim 5 wherein the water-soluble compound employed is fructose, lactorse, sorbitol, sucrose or acetamide.

9. Holographic material according to claim 5 wherien the water soluble compound employed yields a colourless aqueous solution which dissolves in water and is soluble to the extent of at least 3 g/liter of water.

10. Holographic film material according to claim 7 wherein the water-soluble compound employed is oluble to the extent of at least 20 g/liter of water.

11. A method of preparing a hologram which comprises hologrpahically exposing a holographic material which comprises a light transparent base having coated thereon at least two gelatino silver halide emulsion layers wherein the shrinkage factor, SF, the ratio of the replay wavelength to the exposing wavelength or the ratio of the thicknesses of the layer before and after processing, of each of the layers differs at least by 0.02, developing the exposed silver halide using a silver halide developing solution and using a rehalogenating bleach bath to remove the developed silver and redistribute it.

12. A method of preparing a hologram which comprises holographically exposing a holographic material which comprises a light transparent base having coated thereon at least two gelatino silver halide emulsion layers wherein the shrinkage factor, SF, the ratio of the replay wavelength to the exposing wavelength or the ratio of the thicknesses of the layer before and after processing, of each of the layer differs at least by 0.02, developing the exposed silver halide using a silver halide developing solution and removing the developed silver using a solvent bleach solution.

13. A hologram prepared by the method of claim 11.

14. A hologram prepared by the method of claim 12.

* * * * *